(12) United States Patent
Hyun

(10) Patent No.: US 6,538,962 B2
(45) Date of Patent: Mar. 25, 2003

(54) METHOD AND APPARATUS FOR RECORDING OPTICAL DISK IN THE EVENT OF BUFFER-UNDERRUN IN OPTICAL DISK DRIVE

(75) Inventor: Sang-Hun Hyun, Kyanagi-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/221,876

(22) Filed: Dec. 29, 1998

(65) Prior Publication Data

US 2002/0118617 A1 Aug. 29, 2002

(30) Foreign Application Priority Data

Dec. 29, 1997 (KR) ............................................ 97/75932

(51) Int. Cl.⁷ .............................................. G11B 7/085
(52) U.S. Cl. ................. 369/30.23; 369/30.24; 369/47.3; 369/47.33; 369/53.2
(58) Field of Search ................. 369/47–48, 50, 369/54, 58, 32, 30.1, 30.19, 30.23, 30.24, 47.13, 47.28, 47.3, 47.31, 47.33, 53.2, 53.22

(56) References Cited

U.S. PATENT DOCUMENTS

| | | | |
|---|---|---|---|
| 4,939,717 A | * | 7/1990 | Ohno et al. |
| 5,640,378 A | * | 6/1997 | Arai et al. ..................... 369/58 |
| 5,764,610 A | * | 6/1998 | Yoshida et al. ............... 369/58 |
| 5,815,472 A | * | 9/1998 | Kuroda et al. |
| 5,883,867 A | * | 3/1999 | Yamamuro ................... 369/54 |

\* cited by examiner

Primary Examiner—W. R. Young
(74) Attorney, Agent, or Firm—Staas & Halsey LLP

(57) ABSTRACT

The present invention is directed to a method of recording source data on an optical disk in the event of a buffer-underrun in an optical disk drive which buffers the source data received from a host computer and writes the source data on the optical disk. In the method, it is determined whether the optical disk is a CD-R (Compact Disk-Recordable) or a CD-RW (CD-ReWritable). If the optical disk is a CD-R, an address next to the recording end of data is detected upon occurrence of a buffer-underrun, the detected address is designated as a program start address of the optical disk, a signal indicative of buffer-underrun generation is transmitted to the host computer, the host computer re-transmits the source data to the optical disk drive, and then the source data is re-written on the optical disk, beginning from the program start address.

26 Claims, 2 Drawing Sheets

METHOD AND APPARATUS FOR RECORDING OPTICAL DISK IN THE EVENT OF BUFFER-UNDERRUN IN OPTICAL DISK DRIVE

CROSS-REFERENCE TO RELATED APPLICATIONS

This application claims the benefit of Korean Application No. 75932/1997, filed Dec. 29, 1997, in the Korean Patent Office, the disclosure of which is incorporated herein by reference.

BACKGROUND OF THE INVENTION

1. Field of the Invention

The present invention relates to a data write operation in an optical disk drive, and more particularly, to a method and apparatus for recording an optical disk in the event of a buffer-underrun possibly generated during a data write operation.

2. Description of the Related Art

In optical recording and reproduction technology using a laser, a data read operation is performed by sensing a variation in the intensity of a laser beam reflected from a data recording surface of an optical disk. Methods of changing the intensity of reflected light, that is, for writing data on an optical disk, include using interference between concave pits formed on a disk and a reference plane (general CD: Compact Disk or DVD: Digital Video Disk or Digital Versatile Disk), changing the polarity of a magneto-optical recording medium (magneto-optical disk), using the intensity of reflected light varied according to the state of a recording layer as in a phase-change disk (CD-RW: CD-ReWritable), and changing the state of organic pigment (CD-R: CD-Recordable). CDs using such methods can be grouped into a reproduction-only type (general CD), a recordable-once type (CD-R), and a rewritable type (CD-RW), according to reproducibility and recordable times. For example, a user can write data once on a CD-R, and plural times on a CD-RW.

An optical disk drive with a data recording capability should be provided in order to write data on a CD-R or a CD-RW. Hereinafter, an optical disk or a disk refers to either the CD-R or the CD-RW.

In a data write operation, the optical disk drive stores write data received from a host computer such as a personal computer (PC) in a buffer, and writes the stored data on a disk when the buffer has a predetermined amount of data. Because the amount of the data received from the host generally exceeds the capacity of the buffer, the optical disk drive simultaneously implements data storage in the buffer and data write on the disk. A possible stoppage or delay of data transmission from the host computer during the data write operation leads to a stoppage or delay in storing data in the buffer, in turn. Thus, the optical disk drive continues writing the data until the buffer is empty. This is termed a buffer-underrun. The buffer-underrun may also be caused when the data recording rate of the optical disk drive is faster than the data transfer rate of the host.

The interruption or delay of data transmission from the host, resulting in the buffer-underrun, can be attributed to multi-tasking or communication in the host computer during a write operation.

Upon occurrence of a buffer-underrun during a data write operation on a CD-R or CD-RW, the optical disk drive outputs a signal indicative of the buffer-underrun to the host computer and stops the write operation. Since the optical disk drive modulates and scrambles input data by a predetermined amount in a predetermined write format prior to writing, the optical disk drive cannot locate the recording end of data on the disk in the event of the buffer-underrun. Therefore, even if the host computer locates the latest recording data from source data and transfers the following as write data, a blank space is produced or overlapped recording of the write data occurs in an unrecorded area of the partially recorded disk. As a result, the data write operation produces errors.

Upon occurrence of the buffer-underrun during a data write operation, the CD-RW is made to be rewritable from the beginning of the CD-RW, while the CD-R cannot be reused and should be discarded.

SUMMARY OF THE INVENTION

Accordingly, it is an object of the present invention to provide a method of automatically recording write data on an optical disk even during a buffer-underrun in an optical disk drive.

It is another object of the present invention to provide a method of recording write data on an optical disk even during a buffer-underrun in an optical disk drive, which enables reuse of the optical disk.

Additional objects and advantages of the invention will be set forth in part in the description which follows and, in part, will be obvious from the description, or may be learned by practice of the invention.

To achieve the above and other objects of the present invention, there is provided a method of recording source data on an optical disk during buffer-underrun in an optical disk drive. In the method in the optical disk drive which buffers source data received from a host computer and writes the source data on the optical disk, it is determined whether the optical disk is a CD-R (Compact Disk-Recordable) or a CD-RW (CD-ReWritable), an address next to a current recording end of data is detected upon occurrence of a buffer-underrun, if the optical disk is a CD-R, the detected address is designated as a program start address of the optical disk, a signal indicative of the buffer-underrun is transmitted to the host computer, the host computer re-transmits the source data to the optical disk drive, and then the source data is re-written on the optical disk, beginning from the program start address.

BRIEF DESCRIPTION OF THE DRAWINGS

The above objects and advantages of the present invention will become more apparent by describing in a detail preferred embodiment thereof with reference to the attached drawings, in which.

DESCRIPTION OF THE PREFERRED EMBODIMENT

Reference will now made in detail to the present preferred embodiment of the present invention, examples of which are illustrated in the accompanying drawings.

Figure 1:
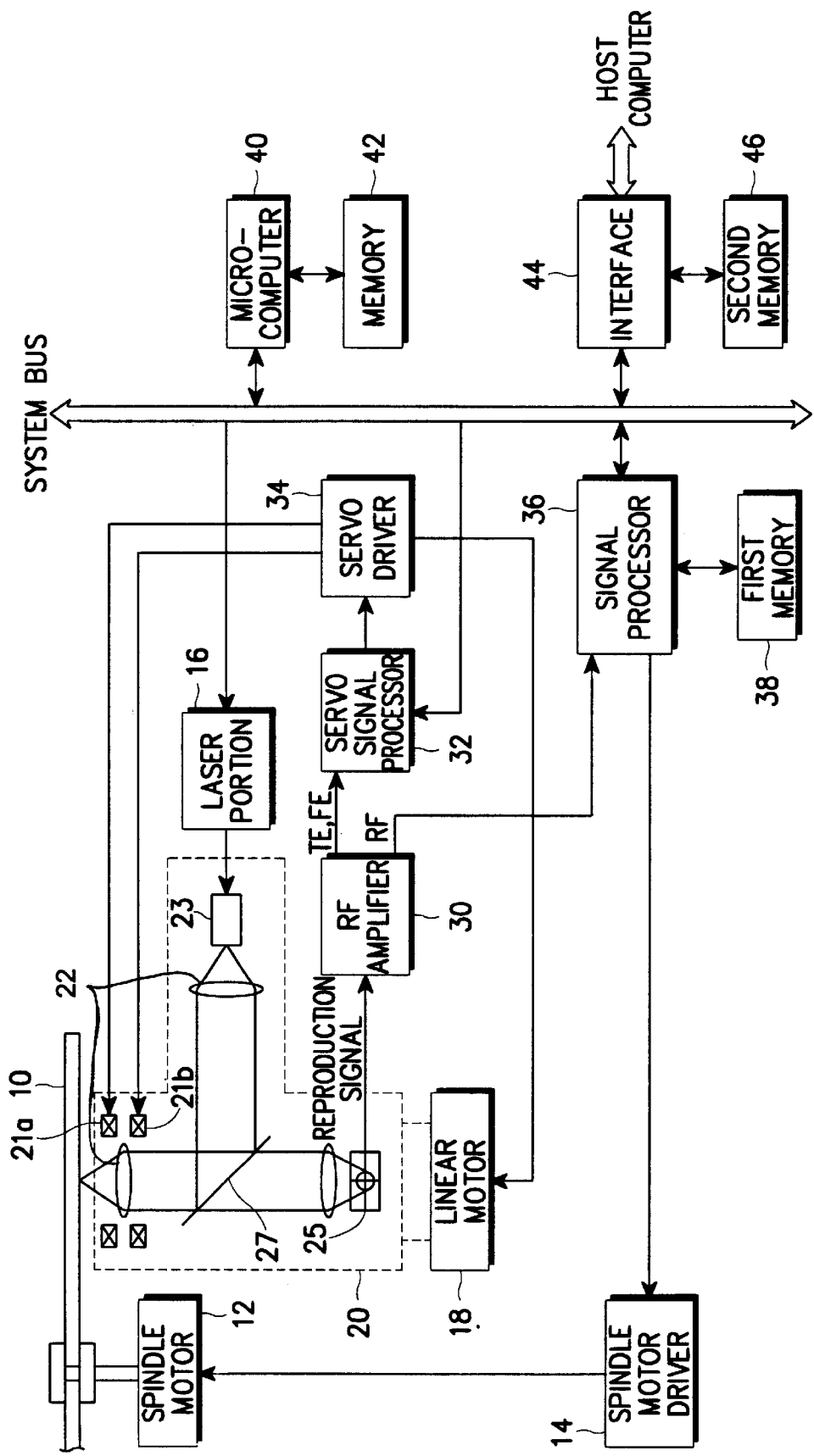
FIG. 1 is a schematic block diagram of an optical disk drive according to an embodiment of the present invention is applied.

In FIG. 1, an optical disk drive, according to an embodiment of the present invention is applied, writes or reads data on or from an optical disk 10 using an optical pickup 20. The optical pickup 20 is supported by a linear motor 18 and moves between the innermost and outermost tracks of the optical disk 10.

The optical pickup 20 includes a semiconductor laser oscillator 23, a plurality of lenses 22, a half prism 27, a tracking coil 21a, a focus coil 21b, and an optical detector 25. For data write, the laser oscillator 23 projects a laser beam at a data recording level on a recording position of the optical disk 10 via the half prism 27 and the lenses 22. For data read, the laser oscillator 23 outputs a laser beam at a data read level, and the laser beam is reflected from a data read position of the optical disk 10 to the optical detector 25 via the half prism 27. A laser portion 16 controls the laser oscillator 23 with regard to laser beam levels and output on/off intervals. The laser portion 16 converts write data applied from a signal processor 36 to a signal suitable for writing, for example, 2-to-7 modulation data, and controls the output of the laser oscillator 23 according to the converted data, during a data write.

The optical detector 25 generates an electrical reproduction signal in accordance with the intensity of the laser beam reflected from the optical disk 10. An RF (Radio Frequency) amplifier 30 amplifies the reproduction signal received from the optical detector 25, removes noise and distortion of the amplified signal, and applies the waveform-corrected signal to the signal processor 36. The RF amplifier 30 also applies signals for focus servo and tracking servo, that is, a focus error signal FE and a tracking error signal TE to a servo signal processor 32. The servo signal processor 32 applies a servo control signal to a servo driver 34 in response to the servo signals, and the servo driver 34 supplies an operational voltage to the focus coil 21b, the tracking coil 21a, and the linear motor 18 of the pickup 20 in response to the servo control signal.

Meanwhile, a spindle motor driver 14 controls a spindle motor 12 in response to a control signal received from the signal processor 36 to rotate at a constant linear velocity (CLV) or a constant angular velocity (CAV).

Upon receipt of the reproduction signal from the RF amplifier 30, the signal processor 36 reproduces data, processes the reproduced data (e.g., error correction), and transmits the processed data to a host computer through an interface 44. Upon receipt of write data from the host computer through the interface 44, the signal processor 36 processes the write data to be suitable for writing, and transmits the processed data to the laser portion 16.

The interface 44 interfaces control signals and data transmitted between the host computer and the optical disk drive. First and second memories 38 and 46 are used for the signal processor 36 and the interface 44, respectively, to buffer data or correct errors. The above-described buffer-underrun may occur when a buffer in the second memory 46 is vacant during data transmission from the host computer.

A microcomputer 40 is coupled to a memory 42 including a ROM for storing control programs and a RAM for temporarily storing data required to implement operations or generated during the operations, and provides an overall control to the optical disk drive.

According to the features of the present invention, the thus-constituted optical disk drive copes with a possible buffer-underrun, and an associated operational program is prepared as a firmware in the microcomputer 40 or stored in the memory 42.

Figure 2:
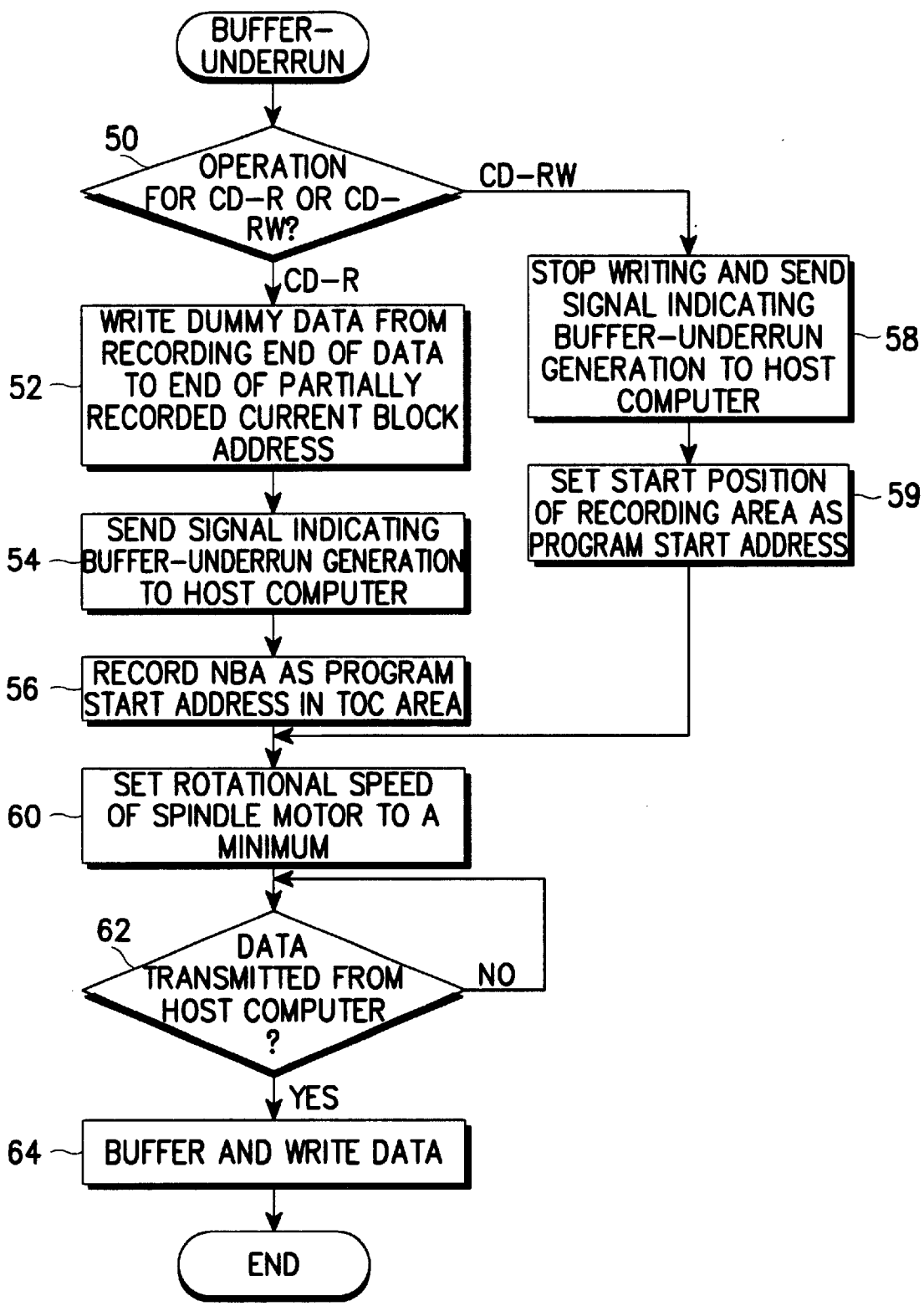
FIG. 2 is a flowchart of a control operation in a microcomputer against during a buffer-underrun according to the embodiment of the present invention.

FIG. 2 is a flowchart of a control operation in the microcomputer 40 in the event of a buffer-underrun according to the embodiment of the present invention. Referring to FIG. 2, upon occurrence of a buffer-underrun during writing data on the optical disk 10, the microcomputer 40 judges whether to operate for a CD-R or CD-RW on the basis of the determination of the type of the optical disk which is made prior to the write operation, in step 50.

To find out the type of the optical disk 10, the microcomputer 40 first determines whether the optical disk 10 is a reproduction-only CD or a CD-R/CD-RW, relying on the fact that ATIP (Absolute Time In Pregroove) data is confined to a track of the CD-R and CD-RW. Then, the microcomputer 40 determines whether the optical disk 10 is the CD-R or the CD-RW by sensing a frequency generated from wobbles. The wobbles are formed at the boundary between tracks in such a way that a laser beam of the optical pickup 10 is focused across the wobbles, to thereby facilitate track seek with the use of frequencies generated from the wobbles. In fact, track seek is not easy in the CD-R or the CD-RW simply by detecting a data recording status because data is recorded by changing the state of organic pigment or the crystalline state of a phase-change material, as compared to the reproduction-only CD recorded by use of pits and lands. In view of this, the wobbles are formed, and the wobbles are different in the CD-R and the CD-RW.

According to the disk type determined by the above method, the microcomputer 40 operates in different ways in the event of the buffer-underrun. In the case of the CD-R, the microcomputer 40 records dummy data from a current recording position at the time point of the buffer-underrun to the end of a partially recorded current block address, in step 52. In step 54, the microcomputer 40 sends a signal indicative of buffer-underrun generation to the host computer. In step 56, a next block address (NBA) is recorded as a program start address in a Table Of Content (TOC) area of the optical disk 10.

The data write is done by predetermined block units, and the locations of these blocks on the optical disk 10, that is, block addresses are perceivable. According to the features of the present invention, the writing of the dummy data from the data recording position at the time point of buffer-underrun to the end of the partially recorded current block address in step 52 is intended to find out the nearest block address (i.e., NBA) after the buffer-underrun. The TOC area called a lead-in area, where the NBA is recorded as a program start address in step 56, contains track information inclusive of a total number of tracks and specification and addresses (i.e., locations on the optical disk 10) of recorded data titles (or files). Reproduction of the information in the TOC area informs the optical disk drive of a data write format of the current optical disk 10 and enables the optical disk drive to reproduce data in the data format. That is, by recording the NBA as a program start address in the TOC area in step 56, the optical disk drive can write or read data from the optical disk 10, beginning from the NBA.

Then, in view of the cause of a buffer-underrun being that the data transfer rate of the host computer slower than a data recording speed on the optical disk 10, the rotational speed of the spindle motor 12 is set to a minimum necessary to write data in step 60, so that the data recording rate is minimized and further the likelihood of the buffer-underrun is reduced. In step 62, it is determined whether data is transmitted from the host computer. Here, the host computer transmits the entire source data again. In step 64, the source data is buffered and written on the optical disk 10, beginning from the NBA, upon data transmission.

The above data re-writing method for the CD-R in the event of buffer-underrun is more effective as the buffer-underrun occurs nearer to the starting point of a data recording area and thus a larger unrecorded data area is left on the optical disk 10.

On the other hand, when the current optical disk is a CD-RW, the procedure jumps from step 50 to step 58. In step 58, the microcomputer 40 stops the data write operation, and outputs a signal indicative of buffer-underrun generation to the host computer. In step 59, the start position of a recording area is designated as a program re-writing position on the optical disk 10. Then, the procedure goes to step 60. Steps 60 and 62 are performed in the same manner as for the CD-R and, in step 64, the source data is buffered and re-recorded on the disk from the starting position of the recording area.

Meanwhile, re-write of data on the CD-RW requires in some cases erasure of the previously written data. This can be achieved by projecting a laser beam at an erasure level on the optical disk 10. Laser output levels such as information recording, reproduction, and erasure levels, and output patterns at such levels are widely known in the art, and an example is disclosed in U.S. Pat. No. 4,939,717 titled "Method and Apparatus for Erasing and Recording Information Using Three Power Levels" and issued to Ohno, et. al., Jul. 3, 1990. The data erasure can be performed before re-writing of the data in step 64.

As described above, the present invention is advantageous in that the optical disk drive can automatically re-write data on an optical disk such as a CD-R and a CD-RW despite a buffer-underrun generated during a data write operation, and the corresponding optical disk can be efficiently reused.

While the present invention has been described in detail with reference to the specific above-described embodiment, it is a mere exemplary application. Thus, it is to be clearly understood that many variations can be made by anyone skilled in the art within the scope and spirit of the present invention.

What is claimed is:

1. A method of recording source data on an optical disk in the event of a buffer-underrun in an optical disk drive which buffers the source data received from a host computer and writes the source data on the optical disk, comprising the steps of:

determining a type of optical disk;

detecting an address next to a recording end of the source data recorded on the optical disk upon occurrence of the buffer-underun, if the optical disk is a recordable-once type;

designating the detected address as a program start address of the optical disk;

transmitting a signal indicative of the buffer-underrun to the host computer;

causing the host computer to re-transmit the source data to the optical disk drive; and writing the source data on the optical disk, beginning from the program start address.

2. The method of claim 1, further comprising the steps of:

designating a start position of a data recording area of the optical disk as the program start address if the optical disk is a rewriteable type;

transmitting the signal indicative of the buffer-underrun generation to the host computer;

causing the host computer to re-transmit the source data to the optical disk drive; and writing the source data on the optical disk, beginning from the program start address.

3. The method of claim 2, wherein the steps of writing the source data on the optical disk each comprise the step of writing the source data at a minimum recording rate of the optical disk drive.

4. The method of claim 2, wherein the steps of writing the source data on the optical disk each comprise the step of setting a rotational speed of a spindle motor which rotates the optical disk to a minimum necessary to perform the writing of the source data on the optical disk.

5. The method of claim 2, further comprising the step of erasing the source data written on the optical disk prior to the buffer-underrun, prior to writing the source data on the optical disk, if the optical disk is a CD-RW.

6. The method of claim 2, wherein the step of causing the host computer to re-transmit the source data to the optical disk drive comprises the step of re-transmitting the entire amount of the source data to be written on the optical disk to the optical disk drive.

7. The method of claim 1, wherein the step of writing the source data on the optical disk comprises the step of writing the source data at a minimum recording rate of the optical disk drive.

8. The method of claim 7, wherein the step of determining a type of disk comprises the steps of:

determining whether the optical disk has Absolute Time In Pregroove (ATIP) data;

sensing a frequency of wobbles formed at boundaries between tracks of the optical disk, wherein an optical pickup is focused across the boundaries, if the optical disk has the ATIP data; and determining the type of disk based upon the frequency of the wobbles.

9. A The method of claim 1, wherein the step of writing the source data on the optical disk comprises the step of setting a rotational speed of a spindle motor which rotates the optical disk to a minimum necessary to perform the writing of the source data on the optical disk.

10. The method of claim 1, wherein the step of detecting an address next to a recording end of the source data comprises the step of recording dummy data from a current recording position at a point in time that the buffer-underrun occurs to an end of a partially recorded current block address.

11. The method claim 10, wherein the data write is performed by predetermined block units.

12. The method of claim 10, further comprising the step of storing the program start address in a Table of Contents (TOC) area of the optical disk.

13. The method of claim 10, wherein the step of determining a type of disk comprises the steps of:

determining whether the optical disk has Absolute Time In Pregroove (ATIP) data;

sensing a frequency of wobbles formed at boundaries between tracks of the optical disk, wherein an optical pickup is focused across the boundaries, if the optical disk has the ATIP data; and determining the type of disk based upon the frequency of the wobbles.

14. The method of claim 1, further comprising the step of storing the program start address in a Table of Contents (TOC) area of the optical disk.

15. The method of claim 1, wherein the step of determining a type of disk comprises the steps of:

determining whether the optical disk has Absolute Time In Pregroove (ATIP) data;

determining whether the optical disk has Absolute Time In Pregroove (ATIP) data;

sensing a frequency of wobbles formed at boundaries between tracks of the optical disk, wherein an optical pickup is focused across the boundaries, if the optical disk has the ATIP data; and determining the type of disk based upon the frequency of the wobbles.

16. A method of recording source data on an optical disk in the event of a buffer-underrun in an optical disk drive which buffers the source data received from an external source and writes the source data on the optical disk, comprising the steps of:

determining an address next to a recording end of the source data recorded on the optical disk prior upon occurrence of the buffer-underrun;

receiving the source data again from the external source in the event of the buffer-underrun; and writing the source data received again from the external source on the optical disk, beginning from the address next to the recording end.

17. The method of claim 16, wherein the optical disk is a CD-R (Compact Disk-Recordable).

18. The method of claim 16, wherein the step of determining an address next to the recording end comprises the step of:

writing dummy data from the recording end to an end of a current partially recorded current block address.

19. The method of claim 16, wherein the address next to the recording end is a next block address.

20. The method of claim 16, wherein the step of writing the source data again on the optical disk comprises the step of setting a rotational speed of a spindle motor which rotates the optical disk to a minimum necessary to perform the re-writing of the source data on the optical disk.

21. The method of claim 16, further comprising the step of writing the address next to the recording end in a Table of Contents (TOC) area of the optical disk.

22. A method of recording source data on an optical disk in the event of a buffer-underrun in an optical disk drive which buffers the source data received from an external source and writes the source data on the optical disk, comprising the steps of:

stopping a writing of the source data on the optical disk if the buffer-underrun occurs;

detecting an address at the stopping of writing of the source data location;

designating a start position of a data recording area of the optical disk next to the address position at which stopping a writing of source data occurred as a program start address;

receiving the source data again from the external source in the event of the buffer-underrun; and writing the source data received again from the external source on the optical disk, beginning from the program start address.

23. The method of claim 22, wherein the optical disk is a CD-R (Compact Disk-Recordable).

24. An apparatus for recording source data on an optical disk in the event of a buffer-underrun in an optical disk drive which buffers the source data received from an external source and writes the source data on the optical disk, comprising:

a buffer memory to buffer the source data from the external source;

an optical pickup unit to write the source data from the buffer memory on the optical disk; and a processing unit determining whether the buffer memory is empty during the writing of the source data on the optical disk, causing a buffer-underrun, and if so, determining an address next to a recording end of the source data recorded on the optical disk upon occurrence of the buffer-underrun or a start position of a data recording area of the optical disk as a program start address, causing the buffer memory to receive the source data again from the external source in the event of the buffer-underrun, and causing the optical pickup unit to write the source data received again from the external source on the optical disk, beginning from the program start address.

25. The apparatus of claim 24, wherein the address next to the recording end of the source data is the program start address if the optical disk is a CD-R (Compact Disk-Recordable).

26. A method of recording source data on an optical disk of recordable-once type in the event of a buffer-underrun in an optical disk drive which buffers the source data received from a host computer and writes the source data on the optical disk, comprising the steps of:

detecting an address next to a recording end of the source data recorded on the optical disk upon occurrence of the buffer-underrun;

designating the detecting address as a program start address of the optical disk;

transmitting a signal indicative of buffer-underrun to the host computer;

causing the host computer to re-transmit the source data to the optical disk drive; and writing the source data on the optical disk, beginning from the program start address.

* * * * *